(12) United States Patent
Schmidt

(10) Patent No.: US 7,831,142 B2
(45) Date of Patent: Nov. 9, 2010

(54) CAMERA VIEWFINDER ACCESSORY MOUNTING DEVICE

(75) Inventor: Robert P. Schmidt, West Hollywood, CA (US)

(73) Assignee: Hoodman Corporation, Torrance, CA (US)

( * ) Notice: Subject to any disclaimer, the term of this patent is extended or adjusted under 35 U.S.C. 154(b) by 177 days.

(21) Appl. No.: 12/290,988

(22) Filed: Nov. 5, 2008

(65) Prior Publication Data

US 2010/0111518 A1    May 6, 2010

(51) Int. Cl.
*G03B 11/04*    (2006.01)
(52) U.S. Cl. ....................................... 396/534
(58) Field of Classification Search ............... 396/373, 396/534, 544; 359/600, 611
See application file for complete search history.

(56) References Cited

U.S. PATENT DOCUMENTS 4,576,459 A * 3/1986 Miura et al. ............... 396/534

\* cited by examiner

*Primary Examiner*—W. B. Perkey
(74) *Attorney, Agent, or Firm*—Fildes & Outland, P.C.

(57) ABSTRACT

A camera viewfinder accessory mounting device is disclosed for a camera viewfinder including an outwardly projecting frame surrounding a viewing window and having opposed mounting members on opposite sides of the window. The device includes a body portion having a viewing opening and cooperative mounting members for slideably engaging the opposed mounting members of the frame. The body portion includes a stop adjacent one end of the cooperative mounting members, and a catch disposed between the cooperative mounting members at another end of the cooperative mounting members and extending perpendicular thereto. The device is slideable over the camera viewfinder frame along the mounting members and the catch latches the frame to secure the device on the viewfinder.

18 Claims, 4 Drawing Sheets

CAMERA VIEWFINDER ACCESSORY MOUNTING DEVICE

TECHNICAL FIELD

This invention relates to cameras having a viewfinder, a more particularly to devices for mounting accessories about a camera viewfinder.

BACKGROUND OF THE INVENTION

It is known in the art relating to digital and film single reflex lens cameras having a viewfinder to utilize mounting rails on an outer portion of the viewfinder to mount various accessories to the camera viewfinder. Conventional accessory mounting devices include multiple parts that engage the mounting rails from the right or left hand side below the rails to lock the mounting device into place over the viewfinder. Alternatively, conventional accessory mounting devices lock into place over the viewfinder by locating and slipping into detents disposed midway in the rail channel. Also, some conventional accessory mounting devices do not lock into place. These conventional accessory mounting devices all have the problem that they tend to insecurely mount to a camera and often fall off the camera.

SUMMARY OF THE INVENTION

The present invention provides a camera viewfinder accessory mounting device that slides over the viewfinder and locks into place along a bottom edge of the viewfinder. The surface area of the device that clasps to the viewfinder may be about 20 times greater than that of conventional mounting devices, thereby making it less likely that the present device will fall off a camera. The device also includes a mount for mounting a variety of accessories to the camera viewfinder. Further, since the present mounting device is more securely mountable on a camera, larger accessories (i.e., heavier and more bulky accessories) can be safely and securely mounted on the viewfinder without falling off.

More particularly, a camera viewfinder includes an outwardly projecting frame surrounding a viewing window and having opposed mounting members on opposite sides of the window. A camera viewfinder accessory mounting device in accordance with the present invention includes a body portion having a viewing opening and cooperative mounting members for slideably engaging the opposed mounting members of the frame. The body portion includes a stop adjacent one end of the cooperative mounting members. A catch is disposed between the cooperative mounting members at another end of the cooperative mounting members and extends perpendicular thereto. The device is slideable over the camera viewfinder frame along the mounting members and the catch latches the frame to secure the device on the viewfinder.

In one embodiment, the body portion may be resilient. The catch may include a beveled surface. The body portion may include a sidewall surrounding the viewing opening, and a flange terminating the sidewall. The sidewall and the flange may define an accessory mount. The sidewall may be tubular and the flange may be ring shaped. An accessory may be mounted on the accessory mount. The accessory may be an eyepiece hood. The body portion may include a gripping surface. The gripping surface may include a plurality of ridges. The viewing opening may be aligned with the camera viewfinder in a mounted position in which the catch may be latched to the frame. The viewing opening may be circular. The body portion may be an injection molded piece.

A method of mounting a camera viewfinder accessory mounting device to a camera viewfinder including an outwardly projecting frame surrounding a viewing window and having opposed mounting members on opposite sides of the window, includes providing a camera viewfinder accessory mounting device including a body portion having a viewing opening and cooperative mounting members for slideably engaging the opposed mounting members of the frame; the body portion including a stop adjacent one end of the cooperative mounting members, and a catch disposed between the cooperative mounting members at another end of the cooperative mounting members and extending perpendicular thereto; sliding the device over the camera viewfinder frame along the mounting members; and latching the frame with the catch to secure the device on the viewfinder.

In one embodiment, the body portion may include a sidewall surrounding the viewing opening, and a flange terminating the sidewall, wherein the sidewall and the flange define an accessory mount, and the method may include the step of mounting an accessory on the accessory mount. The body portion may include a gripping surface, and the method may include the step of gripping the device at the gripping surface. The device may be formed by injection molding.

These and other features and advantages of the invention will be more fully understood from the following detailed description of the invention taken together with the accompanying drawings.

DETAILED DESCRIPTION OF THE INVENTION

Figure 1:
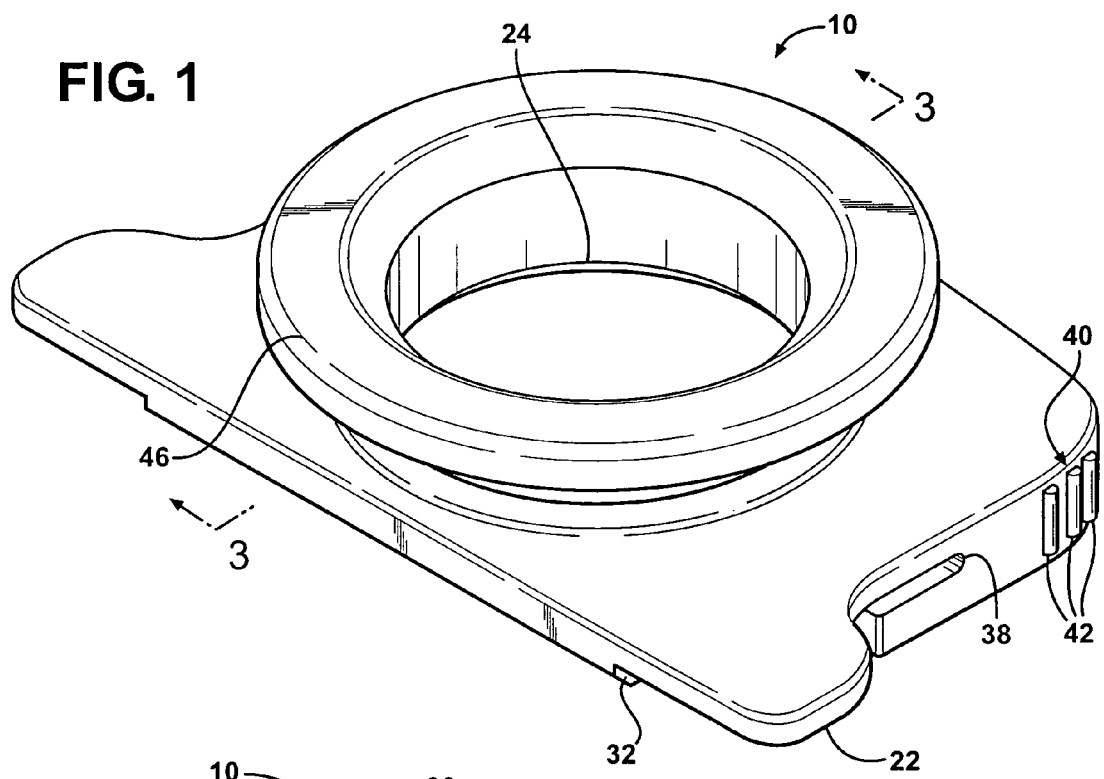
FIG. 1 is a front perspective view of a camera viewfinder accessory mounting device in accordance with the present invention.
Figure 2:
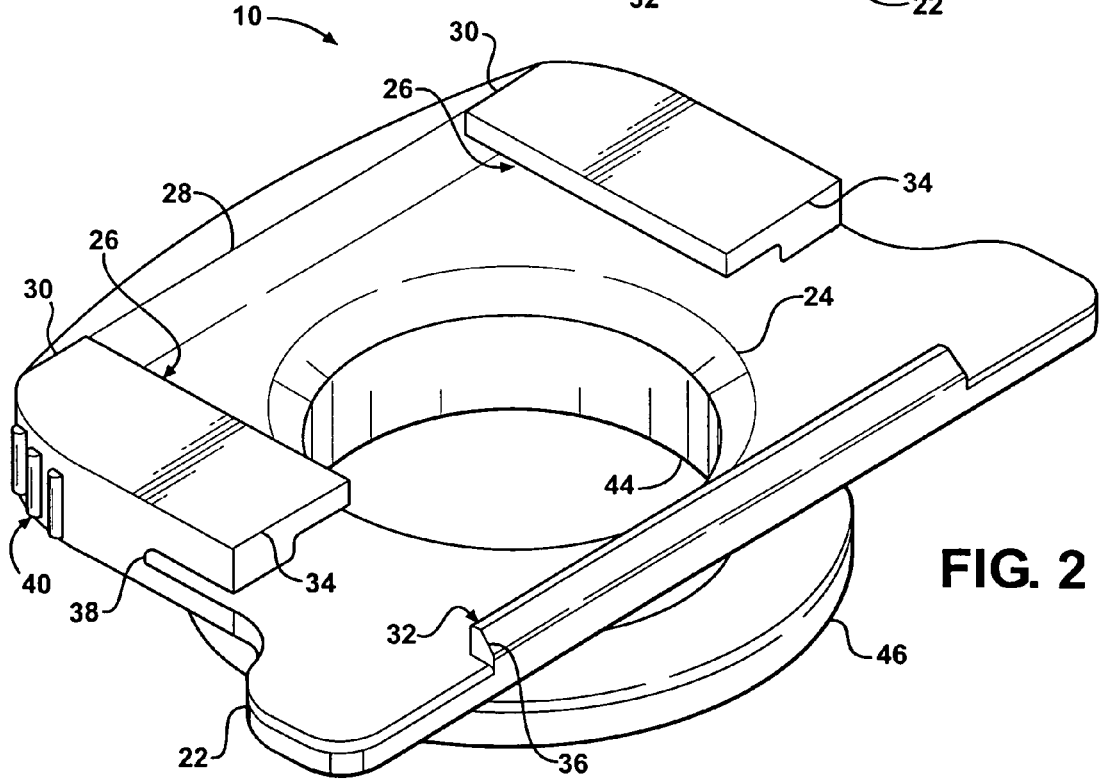
FIG. 2 is a rear perspective view of the camera viewfinder accessory mounting device.
Figure 3:
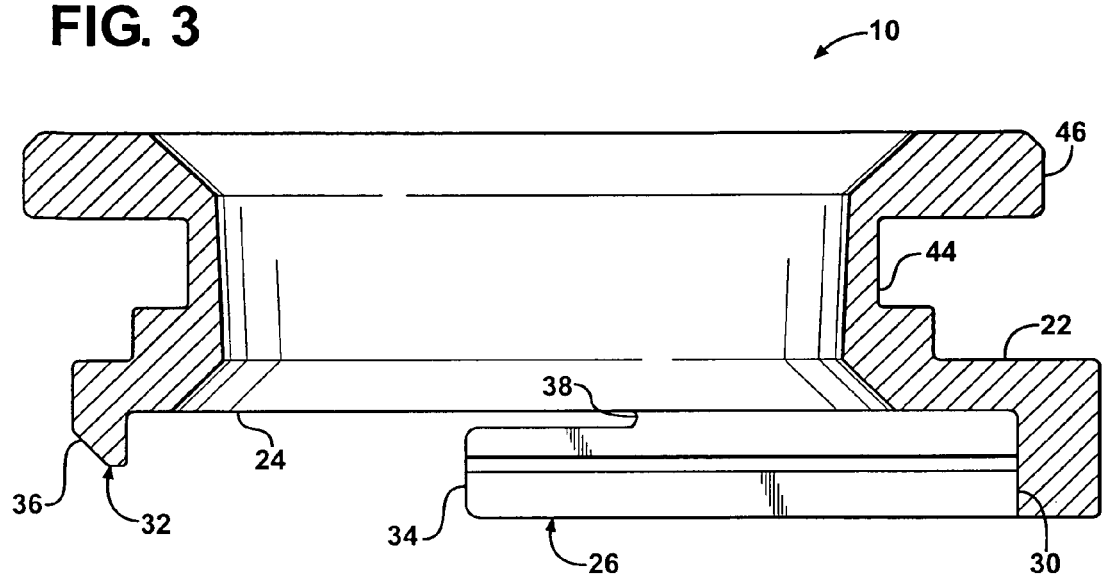
FIG. 3 is a cross-sectional view of the camera viewfinder accessory mounting device taken along the line 3-3 in FIG. 1.

Referring now to the drawings in detail, numeral 10 generally indicates a camera viewfinder accessory mounting device in accordance with the present invention for use with a camera 12 having a viewfinder 14 including an outwardly projecting frame 16 surrounding a viewing window 18 and having opposed mounting members 20 on opposite sides of the viewing window. The camera viewfinder accessory mounting device 10 is a self-locking device that slides over the mounting members 20 of the viewfinder 14 and snapingly locks into place along an edge of the viewfinder that is generally perpendicular to the mounting members. The device 10 shields the viewfinder 14 and provides an eyepiece for viewing the viewfinder. The device 10 also provides a mount for mounting various accessories that are used in conjunction with the viewfinder 14.

Turning to FIGS. 1 through 5, the camera viewfinder accessory mounting device 10 includes a body portion 22 having a viewing opening 24 and cooperative mounting members 26 that are capable of slideably engaging the opposed mounting members 20 of the viewfinder frame 16. The viewing opening 24 is shown as being circular, but a viewing opening having a shape other than a circular shape (e.g., square, rectangular, etc.) is within the scope of the invention. The body portion 22 includes a stop 28 adjacent one end 30 of the cooperative mounting members 26. A catch 32 is disposed between the cooperative mounting members 26 at another end 34 of the cooperative mounting members and extends perpendicular thereto. The catch 32 may include a beveled surface 36 that facilitates engagement of the catch 32 with the viewfinder frame 16 when mounting the device 10 on the viewfinder 14 as described in more detail below. The surface area of the catch 32 that engages the viewfinder frame 16 may be about 20 times greater than the surface area of conventional devices that are mountable on the frame.

The body portion 22 may be a unitary, integral piece. For example, the body portion 22 may be formed by injection molding. The body portion 22 may also be resilient such that the body portion can flex as the device 10 is mounted on the viewfinder 14. The resiliency of the body portion 22 may be imparted by the material of construction of the body portion. For example, the body portion 22 may be made of an ABS rubber material or similar. Also, the body portion 22 may include a joint 38 between the cooperative mounting members 26 and the catch 32 that allows that catch to move relative to the cooperative mounting members.

The body portion 22 may also include a gripping surface 40. The gripping surface 40 may include a plurality of ridges 42, although the gripping surface may be any surface that provides friction for a user's fingers. The gripping surface 40 aid a user in holding and moving the device 10 during mounting and dismounting of the device on the viewfinder 14.

Figure 4:
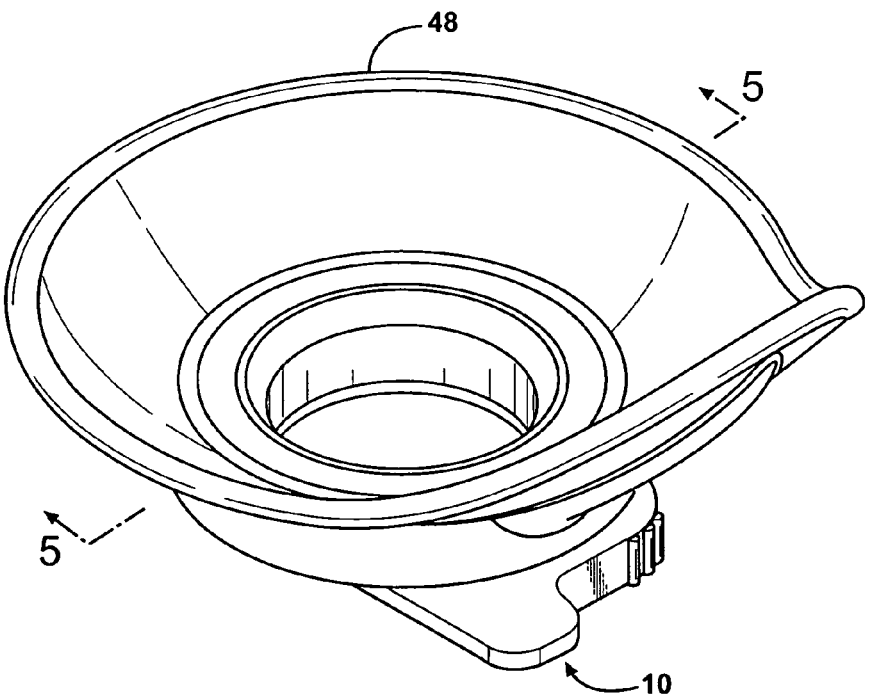
FIG. 4 is a perspective view of an accessory mounted on the camera viewfinder accessory mounting device.
Figure 5:
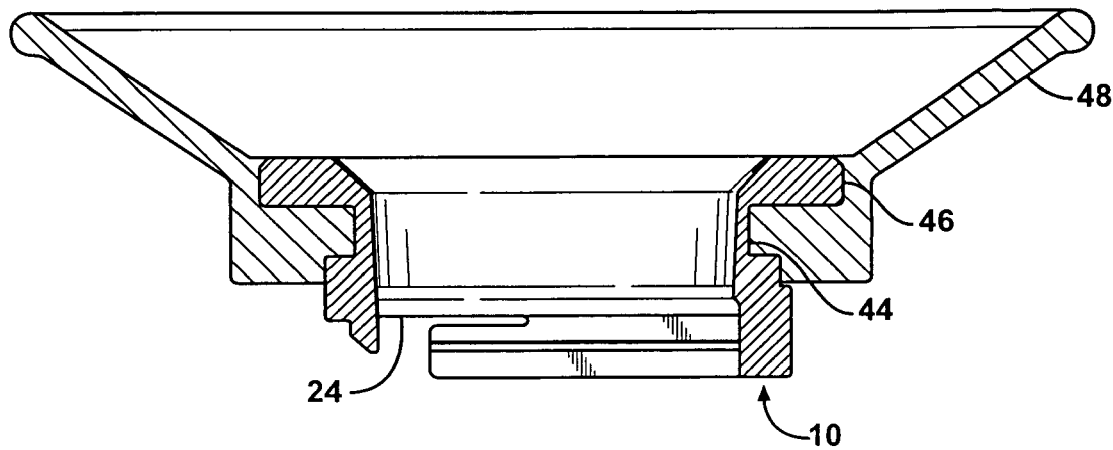
FIG. 5 is a cross-sectional view of taken along the line 5-5 in FIG. 4.

The body portion 22 may include a sidewall 44 surrounding the viewing opening 24 and extending outwardly therefrom. In one embodiment, a flange 46 is disposed at a terminal end of the sidewall 44. The sidewall 44 may be tubular, for example when the viewing opening 24 is circular, and the sidewall may include one or more steps. The flange 46 may be ring shaped, for example when the sidewall 44 is tubular, the flange 46 forms a ringed lip around the terminal end of the sidewall. The sidewall 44 and the flange 46 define an accessory mount. An accessory 48 may be mounted on the accessory mount. The accessory 48 may be an eyepiece hood as shown in FIGS. 4 and 5, although any of a plurality of various accessories may be mounted on the accessory mount. In an alternative embodiment, the sidewall may have a shape and design that is not tubular. Also, the sidewall may not be continuous with the viewing opening. For example, the sidewall may have a square shape that is larger than and surrounds a circular viewing opening. Therefore, it should be understood that the accessory mount on the body portion 22 may have any type of shape and design that facilitates mounting a viewfinder accessory to the viewfinder accessory mounting device 10.

Figure 6:
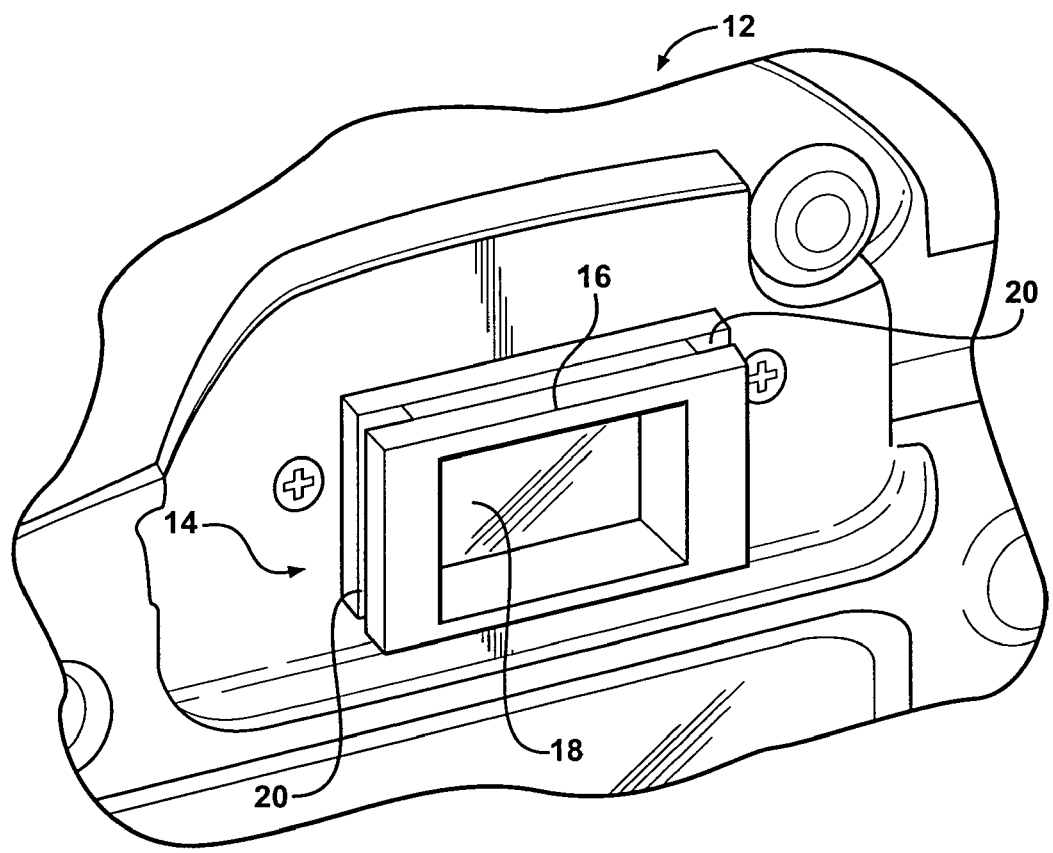
FIG. 6 is a perspective view of a camera having a viewfinder including an outwardly projecting frame.
Figure 7:
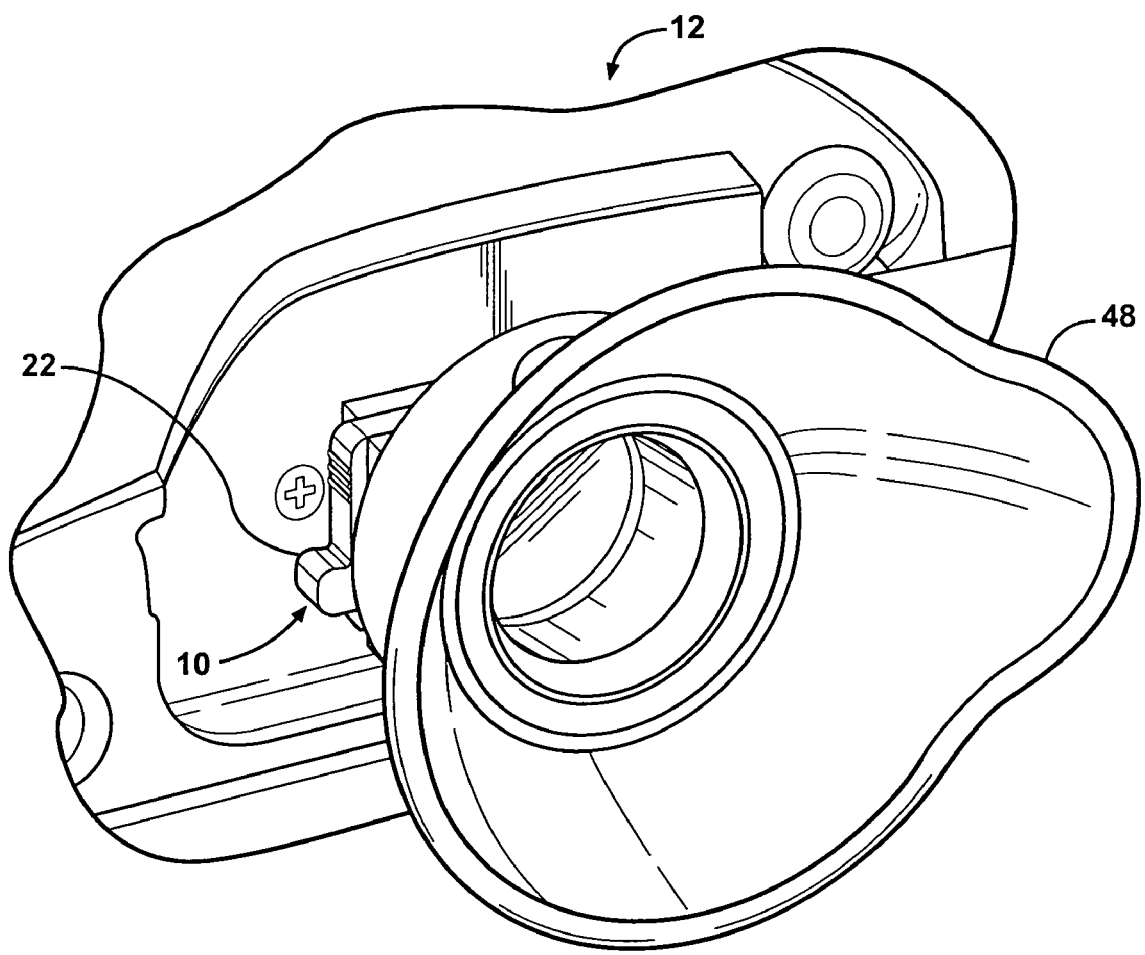
FIG. 7 is a perspective view of the camera viewfinder accessory mounting device mounted on the camera viewfinder.

Turning to FIGS. 6 and 7, the device 10 is slideable over the camera viewfinder frame 16 along the mounting members 20, and the catch 32 latches the frame to secure the device on the viewfinder 14. More specifically, a user may pick up and hold the device 10 by placing a thumb and finger on the gripping surfaces 40. The user may then position the device 10 generally above a top edge of the *viewfinder frame 16 of the camera 12. In this description, the base of the camera 12 is considered to be the "bottom" of the camera and the "top" of the camera is opposite the base, regardless of whether the camera 12 is actually in an upright position with the base resting on a horizontal surface. With the device 10 positioned above the viewfinder frame 16, the user then manipulates the device 10 in a downward direction relative to the viewfinder frame. As the device 10 moves downward, the bevel 36 of the catch 32 engages the viewfinder frame 16, and the catch flexes the body portion 22 outward as the catch slides over the viewfinder frame 16. At generally the same time, as the user moves the device 10 downward, the cooperative mounting members 26 of the device 10 are engaged with the mounting members 20 along the sides of the viewfinder frame 16. When the catch 32 reaches the bottom edge of the viewfinder frame 16, the catch snaps into place along the bottom edge of the viewfinder frame to latch the frame. The device 10 is now in a mounted position.

In the mounted position, the stop 28 may contact the top edge of the viewfinder frame 16 to further limit movement of the device 10. Also, the viewing opening 24 of the device 10 may be aligned with the viewing window 18 of the camera viewfinder 14, allowing the user to view the viewfinder through the opening 24.

To dismount the device 10, the user may use a thumb and/or fingers to release the catch 32 from the bottom edge of the viewfinder frame 16 while moving the device upward relative to the viewfinder frame. As the device 10 is moved upward, the catch 32 slides over the viewfinder frame 16 and the cooperative mounting members 26 slide along the mounting members 20 of the frame. When the catch 32 reaches the top of the viewfinder frame 16, the cooperative mounting members 26 release from the mounting members 20 and the device 10 is fully dismounted.

Although the invention has been described by reference to a specific embodiment, it should be understood that numerous changes may be made within the spirit and scope of the inventive concepts described. Accordingly, it is intended that the invention not be limited to the described embodiment, but that it have the full scope defined by the language of the following claims.

What is claimed is:

1. A camera viewfinder accessory mounting device for a camera viewfinder including an outwardly projecting frame surrounding a viewing window, said frame having opposed mounting members on opposite sides of said window, said device comprising:
   a body portion having a viewing opening and cooperative mounting members for slideably engaging said opposed mounting members of said frame;
   said body portion including a stop adjacent one end of said cooperative mounting members, and a catch disposed between said cooperative mounting members at another end of said cooperative mounting members and extending perpendicular thereto;
   whereby said device is slideable over said camera viewfinder frame along said mounting members and said catch latches said frame to secure said device on said viewfinder.

2. The device of claim 1, wherein said body portion is resilient.

3. The device of claim 1, wherein said catch includes a beveled surface.

4. The device of claim 1, including an accessory mount extending from said body portion.

5. The device of claim 4, wherein said body portion includes a sidewall surrounding said viewing opening, and a flange terminating said sidewall, said sidewall and said flange defining said accessory mount.

6. The device of claim 5, wherein said sidewall is tubular and said flange is ring shaped.

7. The device of claim 5, including an accessory mounted on said accessory mount.

8. The device of claim 7, wherein said accessory is an eyepiece hood.

9. The device of claim 1, wherein said body portion includes a gripping surface.

10. The device of claim 9, wherein said gripping surface includes a plurality of ridges.

11. The device of claim 1, wherein said viewing opening is aligned with said camera viewfinder in a mounted position wherein said catch is latched to said frame.

12. The device of claim 1, wherein said viewing opening is circular.

13. The device of claim 1, wherein said body portion is an injection molded piece.

14. A method of mounting a camera viewfinder accessory mounting device to a camera viewfinder including an outwardly projecting frame surrounding a viewing window, said frame having opposed mounting members on opposite sides of said window, said method comprising the steps of:
   providing a camera viewfinder accessory mounting device including a body portion having a viewing opening and cooperative mounting members for slideably engaging said opposed mounting members of said frame; said body portion including a stop adjacent one end of said cooperative mounting members, and a catch disposed between said cooperative mounting members at another end of said cooperative mounting members and extending perpendicular thereto;
   sliding said device over said camera viewfinder frame along said mounting members; and
   latching said frame with said catch to secure said device on said viewfinder.

15. The method of claim 14, wherein an accessory mount extends from said body portion; and
   said method includes the step of mounting an accessory on said accessory mount.

16. The method of claim 15, wherein said body portion includes a sidewall surrounding said viewing opening, and a flange terminating said sidewall, said sidewall and said flange defining said accessory mount.

17. The method of claim 14, wherein said body portion includes a gripping surface; and
   said method includes the step of gripping said device at said gripping surface.

18. The method of claim 14, wherein said device is formed by injection molding.

* * * * *